US012264879B2

(12) United States Patent
Li et al.

(10) Patent No.: US 12,264,879 B2
(45) Date of Patent: Apr. 1, 2025

(54) KILN SYSTEM AND METHOD FOR FIRING CERAMSITE AND BY-PRODUCING WASTE HEAT BY UTILIZING RAW MATERIALS WITH HEATING VALUES

(71) Applicants: University of Science and Technology Beijing, Beijing (CN); Shandong Econ Energy Saving Technology Co., Ltd, Zibo (CN)

(72) Inventors: Yu Li, Beijing (CN); Changqing Yao, Zibo (CN)

(73) Assignees: University of Science and Technology Beijing, Beijing (CN); Shandong Econ Energy Saving Technology Co., Ltd, Zibo (CN)

( * ) Notice: Subject to any disclaimer, the term of this patent is extended or adjusted under 35 U.S.C. 154(b) by 578 days.

(21) Appl. No.: 17/585,591

(22) Filed: Jan. 27, 2022

(65) Prior Publication Data

US 2022/0236009 A1 Jul. 28, 2022

(30) Foreign Application Priority Data

Jan. 27, 2021 (CN) ......................... 202110110281.6

(51) Int. Cl.
*F27D 17/10* (2025.01)
*F27B 9/12* (2006.01)

(52) U.S. Cl.
CPC ................ *F27D 17/10* (2025.01); *F27B 9/12* (2013.01); *F27B 2009/122* (2013.01); *F27B 2009/124* (2013.01); *F27D 17/102* (2025.01)

(58) Field of Classification Search
None
See application file for complete search history.

(56) References Cited

U.S. PATENT DOCUMENTS 6,168,424 B1 * 1/2001 Raynaud ................ C04B 20/04 432/15
6,318,278 B1 * 11/2001 Dugue .................. F27B 7/2033 432/106
2005/0274293 A1 * 12/2005 Morton ................... F27D 17/00 106/745

* cited by examiner

*Primary Examiner* — David J Laux

(57) ABSTRACT

A kiln system is provided, including a drying section, a preheating section, a firing section, a soaking section, a cooling section, and a decarburization section arranged between the drying section and the preheating section. The decarburization section includes an ignition zone, a hot air combustion/pyrolysis zone, and a waste heat recovery pipeline. A heat source is introduced into the ignition zone so that the temperature of the ceramsite of the raw materials with heating values in the zone is 400° C. to 900° C. The hot air combustion/pyrolysis zone is configured for combusting or pyrolyzing carbon-containing materials and organic components in the raw materials with heating values in the ceramsite. The waste heat recovery pipeline is configured for discharging decarburization exhaust gas and recovering heat released after the raw materials with heating values in the ceramsite are combusted or pyrolyzed in the decarburization exhaust gas.

20 Claims, 3 Drawing Sheets

KILN SYSTEM AND METHOD FOR FIRING CERAMSITE AND BY-PRODUCING WASTE HEAT BY UTILIZING RAW MATERIALS WITH HEATING VALUES

CROSS REFERENCE TO THE RELATED APPLICATIONS

This application is based upon and claims priority to Chinese patent application No.: 202110110281.6, filed on Jan. 27, 2021, the entire contents of which are incorporated herein by reference.

TECHNICAL FIELD

The present invention belongs to the field of ceramic product firing and kilns, and particularly relates to a kiln system and method for firing ceramsite and by-producing waste heat by utilizing raw materials with heating values.

BACKGROUND

As an important building material and refractory material, ceramsite is typically fired by employing a process with a rotary kiln or a sintering machine. Although the environment is protected and temperature can be adjusted when the rotary kiln is used to fire ceramsite, in the whole process of performing heating at the kiln head and discharging hot air from the kiln tail, the process of heat exchange between exhaust gas and ceramsite is determined according to a length and rotational speed of the rotary kiln rather than the requirement of raw material heating. Moreover, since the filling rate is only 10% of the internal volume, the thermal efficiency is low, energy consumption is high, and the yield is low. Since the sintering machine fires ceramsite by internal combustion heating, most of product types are low-end products, and ceramsite is exposed in the air in the process of firing, leading to great heat loss and low yield.

In addition, solid wastes with heating values are usually used in the process of industrial calcination. However, in the two aforementioned ceramsite firing processes, the progress, temperature and air volume of sintering cannot be adjusted in the process of sintering raw pellets, and a large quantity of solid wastes with heating values cannot be added as a raw material. In the process with the rotary kiln, components with high carbon or organic matter content can enter the firing stage without combusting or pyrolytically reacting thoroughly in the firing process, and as a result, black cores are formed, leading to a decrease in properties. In the process with the sintering machine, overhigh heating values can lead to over-firing, caking or deformation of raw pellets, and as a result, it is difficult to ensure product properties.

SUMMARY

In view of the problems above, embodiments of the present invention provide a tunnel kiln system for firing ceramsite by utilizing raw materials with heating values and a preparation method. By adding an independent decarburization section to control decarburization temperature, gas quantity and oxygen content, the pyrolysis or combustion process of raw materials with heating values in ceramsite is controlled, so that remaining heating value in the ceramsite is controlled, which ensures that the decarburized ceramsite in a firing section can obtain good properties and increases the utilization rate of the raw materials with heating values. Moreover, an exhaust gas byproduct with high-temperature waste heat is generated, reducing the energy consumption of the system and protecting the environment.

In order to achieve the above-mentioned objective, the embodiments of the present invention adopt the following technical solution:

In a first aspect, an embodiment of the present invention provides a kiln system for firing ceramsite and by-producing waste heat by utilizing raw materials with heating values, which includes a drying section, a preheating section, a firing section, a soaking section, and a cooling section, and further includes a decarburization section arranged between the drying section and the preheating section. The decarburization section includes an ignition zone, a hot air combustion/pyrolysis zone, and a waste heat recovery pipeline. A heat source is introduced into the ignition zone so that the temperature of the ceramsite of the raw materials with heating values in the ignition zone is 400° C. to 900° C. The hot air combustion/pyrolysis zone is configured for combusting or pyrolyzing carbon-containing materials and organic components in the raw materials with heating values in the ceramsite. The waste heat recovery pipeline is configured for discharging decarburization exhaust gas and recovering heat released after the raw materials with heating values in the ceramsite are combusted or pyrolyzed in the decarburization exhaust gas.

As a preferred embodiment of the present invention, the kiln is a belt type roasting machine or a static roasting tunnel kiln.

As a preferred embodiment of the present invention, the heat source of the ignition zone comes from the hot air drawn out from the preheating section and/or the firing section, or an ignition nozzle is arranged in the ignition zone, and the ignition nozzle is configured for providing a heat source for the ignition zone.

As a preferred embodiment of the present invention, the hot air combustion/pyrolysis zone is provided with a blast pipeline, which is configured for blowing in air preheated by the waste heat recovery pipeline.

As a preferred embodiment of the present invention, the drying section is divided into a blast drying section and a draft drying section. The blast drying section utilizes the hot air coming from: the cooling section, the hot air heated by the waste heat recovery pipeline, the mixture of the hot air coming from the cooling section and the hot air heated by the waste heat recovery pipeline, or the hot air produced by mixing the exhaust gas discharged by the firing section and the soaking section with cold air to cool down to 250° C. to 400° C. The draft drying section utilizes the hot air discharged by the preheating section or the hot air discharged by the firing section and soaking section.

As a preferred embodiment of the invention, after the ceramsite passes through the decarburization section, the heating value of the ceramsite at the outlet of the decarburization section is not higher than 400 kJ/kg.

In a second aspect, an embodiment of the present invention further provides a method for firing ceramsite and by-producing waste heat by utilizing raw materials with heating values, which includes:

batching and then pelletizing raw materials with heating values and auxiliary raw materials to form raw pellets with an average grain size of 3 mm to 15 mm;

spreading the raw pellets on a kiln car or a trolley to form a raw material layer with a height of 300 mm to 500 mm, and arranging fired and returned ceramsite under and at both sides of the raw material layer;

sending the kiln car into the kiln system as described above to pass through a drying section, a decarburization section, a preheating section, a firing section, a soaking section and a cooling section, so that ceramsite with a bulk density of 0.5-1.5 g/cm$^3$ is prepared; and at the same time, recovering waste heat in the decarburization section through a waste heat recovery pipeline.

As a preferred embodiment of the present invention, the raw materials with heating values are solid wastes with heating values of 500 kJ/kg to 8,500 kJ/kg (including coal gangue, coal slime, fly ash, slag, fluidized bed ash, coal gasification ash, oil sludge, sludge, oil shale, organic solid wastes and/or domestic garbage) and/or waste coke and cinder with heating values of 8,500 kJ/kg to 30,000 kJ/kg.

As a preferred embodiment of the present invention, when the raw materials with heating values and the auxiliary raw materials are batched, if the heating value content of the raw materials with heating values is 500 kJ/kg to 8,500 kJ/kg, the content of the solid wastes is 30% to 100%; if the heating value content is 8,500 kJ/kg to 30,000 kJ/kg, the content of the solid wastes is 0.5% to 25%; and heating value of these final raw pellets composed of the raw materials with heating values and the auxiliary raw materials is 500 kJ/kg to 8,500 kJ/KG.

As a preferred embodiment of the present invention, the ceramsite with a bulk density of 0.5-1.5 g/cm3 includes porous lightweight ceramsite with a bulk density of 0.5-1.0 g/cm$^3$ or ordinary ceramsite with a bulk density of 1.0-1.5 g/cm$^3$.

The present invention has the following beneficial effects:

According to the kiln system and method for firing ceramsite and by-producing waste heat by utilizing raw materials with heating values provided by the embodiments of the invention, the raw material range of ceramsite is expanded by adding the decarburization section between the drying section and the preheating section of the kiln system, so that raw materials (such as solid wastes with heating values of 500 kJ/kg to 3,500 kJ/kg), including coal gangue, coal slime, oil sludge, sludge, oil shale, organic solid wastes, domestic garbage and hard-to-separate raw materials mixed with coal, carbon, coke, oil, oil paint, etc., can be utilized in a high content to fire ceramsite. This invention solves the problem that a high content of solid wastes with high heating values can lead to black cores in ceramsite and a decrease in quality. Moreover, in the process of mass-preparing ceramsite and utilizing solid wastes, heat is recycled synchronously, so that both the solid wastes with heating values and the heat are utilized on a large scale and efficiently; and the whole system has the advantages of low comprehensive energy consumption, balanced temperature control, environment-friendliness, and wide application prospect.

BRIEF DESCRIPTION OF DRAWINGS

In order to more clearly illustrate the technical solution in embodiments of the present invention or the prior art, the accompanying drawings which need to be used in the description of the embodiments or the prior art will be introduced briefly below. Apparently, the accompanying drawings described below are merely some embodiments of the present invention, and those of ordinary skill in the art can also obtain other accompanying drawings according to these drawings without making creative efforts.

DETAILED DESCRIPTION OF THE EMBODIMENTS

Embodiments of the present invention will be described in detail below with reference to the accompanying drawings. Apparently, the embodiments described are merely part of the embodiments of the present invention rather than all the embodiments. On the basis of the embodiments in the present invention, all other embodiments which those skilled in the art obtain without making creative efforts shall fall within the protection scope of the present invention.

Embodiment 1

The present embodiment provides a kiln system for firing ceramsite and by-producing waste heat by utilizing raw materials with heating values, with the kiln being a static roasting tunnel kiln or a belt type roasting machine. The present embodiment takes the tunnel kiln as an example for description, and the following description is also applicable to the belt type roasting machine.

Figure 1:
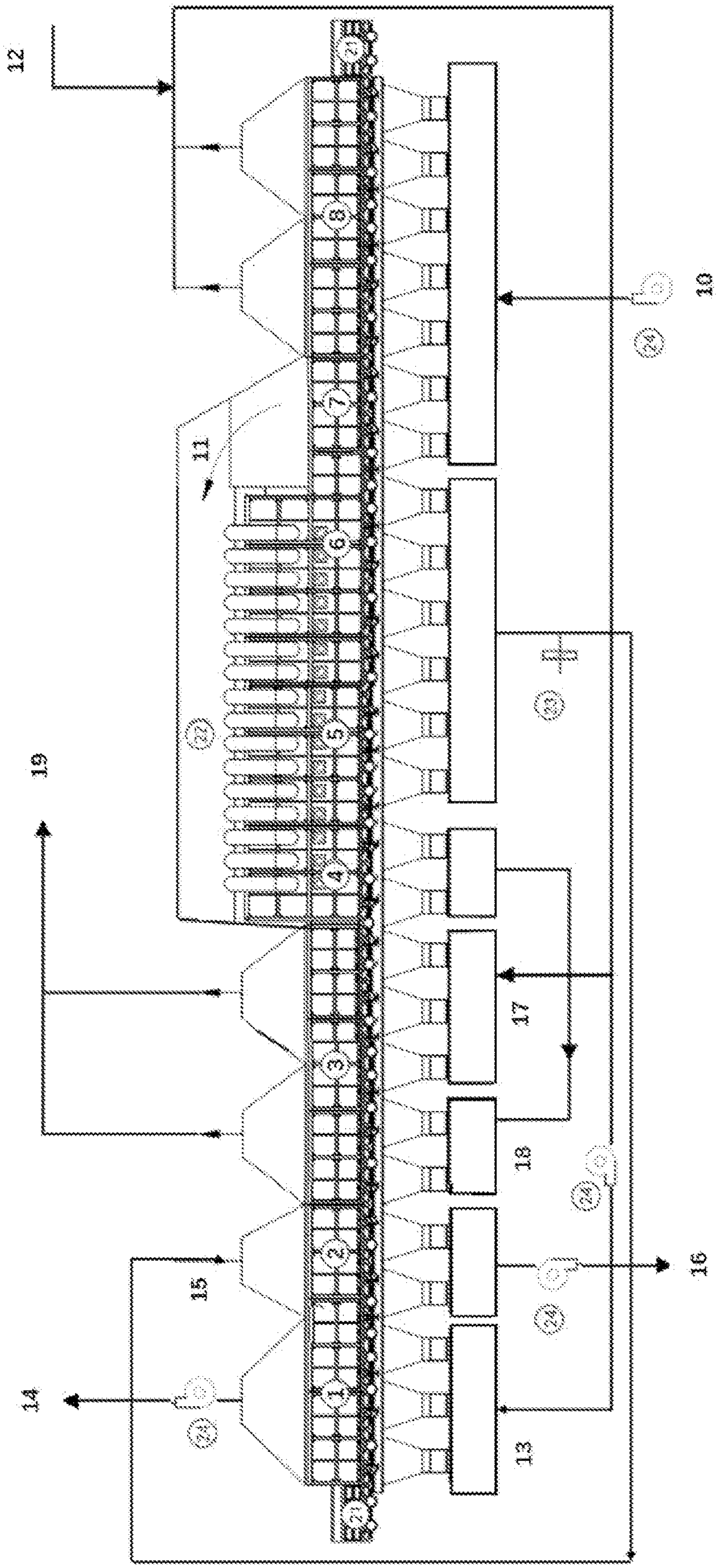
FIG. 1 is a schematic structural diagram of a kiln system for firing ceramsite and by-producing waste heat by utilizing raw materials with heating values according to embodiment 1 of the present invention.

As shown in FIG. 1, the tunnel kiln system includes a fully enclosed kiln body consisting of a drying section, a decarburization section 3, a preheating section 4, a firing section 5, a soaking section 6 and a cooling section and air ducts arranged in each section of the kiln. The decarburization section 3 includes an ignition zone, a hot air combustion/pyrolysis zone, and a waste heat recovery pipeline 19.

The drying section is divided into a blast drying section 1 and a draft drying section 2, which are respectively connected to a first exhaust gas treatment system 14 and a second exhaust gas treatment system 16. The hot air in the blast drying section 1 comes from the hot air at 250° C. to 400° C. in the cooling section, which is blown in from the pipeline 13 by a blower 24, and the hot air is further discharged into the first exhaust gas treatment system 14 after drying ceramsite. The hot air of the draft drying section 2 comes from the hot air of the firing section 5 and the soaking section 6, which is introduced from a draft pipeline 15 by a draft fan 23, and the hot air is further discharged into the second exhaust gas treatment system 16 after drying the ceramsite. In further embodiments, the hot air of the blast drying section 1 may also come from the hot air heated by the waste heat recovery pipe 19, the mixture of the hot air coming from the cooling section and the hot air heated by the waste heat recovery pipeline 19, the hot air produced by mixing exhaust gas discharged by the firing section 5 and the soaking section 6 with cold air to cool down to 250° C. to 400° C., or the hot air produced by mixing the hot air of the cooling section with the air introduced by a pipeline 12.

The decarburization section 3 sequentially includes an ignition zone, a hot air combustion/pyrolysis zone, and a waste heat recovery pipeline 19, with the waste heat recovery pipeline 19 communicating with the hot air combustion/pyrolysis zone. The heat of the ignition zone comes from the high-temperature exhaust gas discharged by the preheating section and/or the firing section and enters the ignition zone through a pipeline 18. In the hot air combustion/pyrolysis zone, it is necessary to ensure a sufficient oxygenation content to fully pyrolyze or combust organic components or raw materials with heating values in the ceramsite, and hot air is introduced through a pipeline 17. The hot air of the hot air combustion/pyrolysis zone comes from the air preheated by cooling the ceramsite in the cooling section, and the preheated air contains a large amount of oxygen, so that combustion can be fully carried out. When the oxygen content is low, a pyrolysis reaction occurs, and sufficient temperature makes the pyrolysis reaction more complete and thorough. After the ceramsite is combusted or pyrolyzed in the hot air combustion/pyrolysis zone of the decarburization section, high-temperature exhaust gas which is 350° C. to 850° C. is generated, which carries by-produced waste heat, and the heat is abundant heat for the whole ceramsite calcination process. The waste heat is recovered through the waste heat recovery pipeline 19 for power generation, steam heating, raw material preparation, supply of waste heat to raw materials, etc. The heat of the exhaust gas discharged by the decarburization section may be directly or indirectly utilized, or may be reused after secondary combustion. For the tail gas of the used waste heat exhaust gas, a third exhaust gas treatment system may be added at the rear section of a waste heat utilization pipeline, or the tail gas may enter the first exhaust gas treatment system 14 or the second exhaust gas treatment system 16, and is treated and discharged together with the wet exhaust gas discharged by the drying section of the kiln for environmental protection.

In a further embodiment, the hot air combustion/pyrolysis zone is also provided with a blast pipeline 17, which is configured for blowing in air preheated by the waste heat recovery pipeline.

All the heat sources of the preheating section 4, the burning section 5 and the soaking section 6 come from the heat which is released after natural gas ignition nozzles 22 combust natural gas and natural gas fully combusts with the preheated air of the cooling section drawn in from the pipeline 11.

The cooling section is divided into a fast cooling section 7 and a slow cooling section 8, and a cooling medium is the air blown in from a pipeline 10 by a blower 24.

The heat recovered by the waste heat recovery pipeline may be used for waste heat power generation, industrial boiler heating, etc. In the process of utilizing waste heat to generate electricity or heat an industrial boiler, heat can be utilized by an air preheater, etc., and the preheated air in the air preheater can be mixed into the preheated air of the cooling section or blown into the hot air combustion/pyrolysis section of the decarburization section.

In the present embodiment, the exhaust gas in each zone is drawn in or blown out through a tuyere or a bellows, which belongs to the prior art and realizes the vertical flow of the exhaust gas through a ceramsite material layer on the kiln car from top to bottom or from bottom to top, and this will not be repeated herein.

Based on the kiln system for firing ceramsite and by-producing waste heat by utilizing raw materials with heating values shown in FIG. 1, the present embodiment further provides a method for firing ceramsite and by-producing waste heat by utilizing raw materials with heating values, which includes the following steps:

Raw materials with heating values (such as coal gangue, coal slime, oil sludge, sludge, oil shale, organic solid wastes, and domestic garbage) and auxiliary raw materials are batched and then pelletized to form raw pellets with an average grain size of 3 mm to 15 mm. Because the heating value content of the aforementioned solid wastes is 500 kJ/kg to 3,500 kJ/kg, the content of the solid wastes is 30% to 100%, and the heating value of the raw pellets is 500 kJ/kg to 3,000 kJ/kg.

After being preliminarily dried, the raw pellets are spread on a kiln car 21 to form a ceramsite material layer with a height of 300 mm to 500 mm, and fired return ceramsite are arranged under and at both sides of the raw material layer.

The raw pellets are continuously distributed, with the raw pellets carried by the kiln car first passing through the blast drying section and the draft drying section; The hot air coming from the cooling section is blown into the blast drying section, so that the hot air vertically flows through the ceramsite material layer on the kiln car from bottom to top to dry the raw pellets, and the hot air coming from the firing section and the soaking section is drawn into the draft drying section by the draft fan, so that the hot air vertically flows through the ceramsite material layer on the kiln car from top to bottom to dry the raw pellets. At this point, the dried raw pellets enter the decarburization section. The wet cold air discharged by the drying sections is treated and discharged by the exhaust gas treatment systems into the atmosphere for environmental protection.

The high-temperature exhaust gas coming from the preheating section heats the raw pellets in the ignition zone of the decarburization section, so that the organic components or the raw materials with heating values in the raw pellets reach an ignition point, and the raw pellets then enter the hot air combustion/pyrolysis zone. The raw materials with heating values or the organic components in the raw pellets begin combustion or pyrolysis in the hot air combustion/pyrolysis zone, thus preventing the formation of block cores in the ceramsite. In this zone, the average temperature reaches 400° C. to 900° C., and high-temperature exhaust gas with a large amount of heat and a temperature of up to 350° C. to 850° C. is released.

The high-temperature exhaust gas discharged from the decarburization section is recycled through the waste heat recovery pipeline, thus realizing the recovery of by-produced waste heat.

The heating value of raw pellets at the outlet of decarburization section is not higher than 400 kJ/kg.

After passing through the decarburization section, the kiln car carrying the raw pellets sequentially passes through the preheating section, the firing section, the soaking section and the cooling section, so as to prepare porous lightweight ceramsite with a bulk density of 0.5-1.0 g/cm$^3$.

Embodiment 2

The present embodiment provides a kiln system for firing ceramsite and by-producing waste heat by utilizing raw materials with heating values, with the kiln being a static roasting tunnel kiln or a belt type roasting machine. The present embodiment takes the tunnel kiln as an example for description, and the following description is also applicable to the belt type roasting machine.

Figure 2:
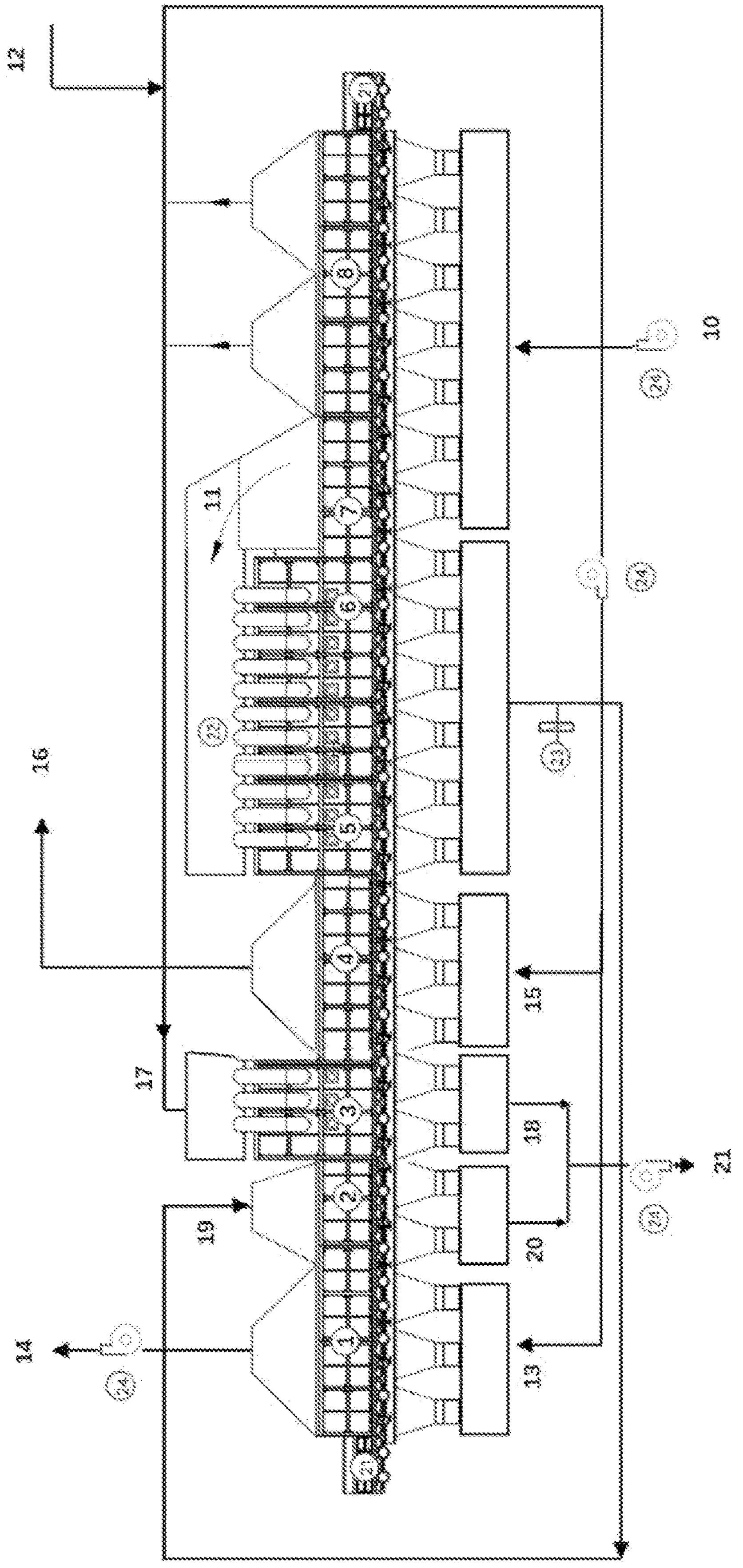
FIG. 2 is a schematic structural diagram of a kiln system for firing ceramsite and by-producing waste heat by utilizing raw materials with heating values according to embodiment 2 of the present invention.

As shown in FIG. 2, the kiln system provided by the present embodiment is in the same sectional state as that of embodiment 1, but the difference is as follows:

The heat of the ignition zone of the decarburization section 3 comes from a burner arranged over the ignition zone, and the raw materials with heating values and the organic components in the raw pellets are ignited by the burner to reach an ignition point; at the same time, the ignition zone introduces preheated air from the cooling section, so that natural gas at the burner sufficiently combusts to provide sufficient heat source for ignition; and the ignition zone of the decarburization section also communicates with the exhaust gas treatment system of the draft drying section, so that ignited exhaust gas is drawn out and discharged together with the exhaust gas of the draft drying section into the exhaust gas treatment system.

The present embodiment further provides a method for firing ceramsite and by-producing waste heat by utilizing raw materials with heating values based on the kiln system shown in FIG. 2. The method is substantially the same as that of embodiment 1, but the difference is as follows:

Raw pellet materials are different. In the present embodiment, solid wastes with heating values (such as waste coke and cinder) and auxiliary raw materials are batched and then pelletized to form raw pellets with an average grain size of 5 mm to 15 mm. Because the heating value content of the aforementioned solid wastes is 8,500 kJ/kg to 30,000 kJ/kg, the content of the solid wastes is 0.5% to 25%, and the heating value of the raw pellets is 500 kJ/kg to 3,000 kJ/kg.

Because the different arrangement of the decarburization section leads to the difference in the ignition method and the exhaust gas treatment method and waste heat recovery is also carried out through the waste heat recovery pipeline of the decarburization section, ordinary ceramsite with a bulk density of 1.0-1.5 g/cm$^3$ is ultimately obtained through the cooling section.

Embodiment 3

The present embodiment provides a kiln system for firing ceramsite and by-producing waste heat by utilizing raw materials with heating values, with the kiln being a static roasting tunnel kiln or a belt type roasting machine. The present embodiment takes the tunnel kiln as an example for description, and the following description is also applicable to the belt type roasting machine.

Figure 3:
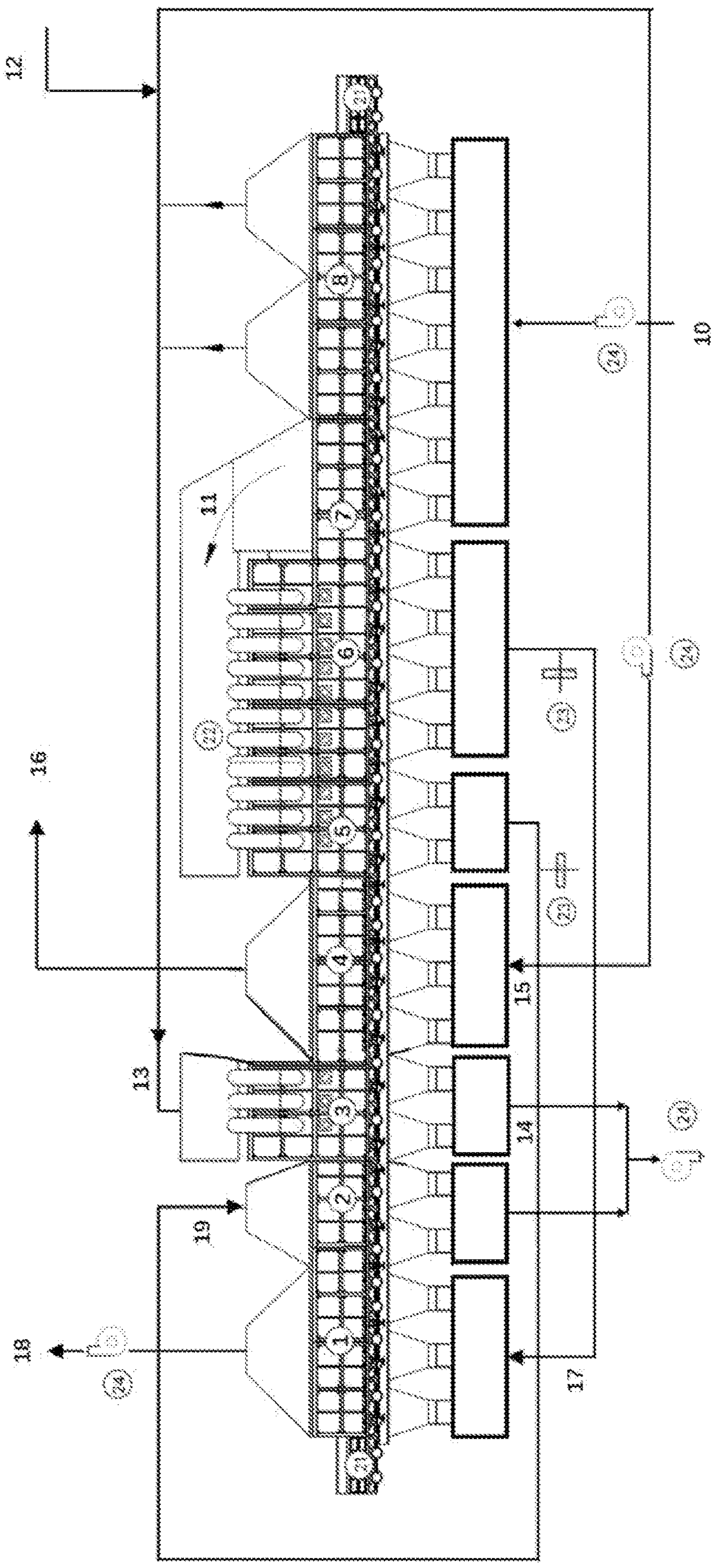
FIG. 3 is a schematic structural diagram of a kiln system for firing ceramsite and by-producing waste heat by utilizing raw materials with heating values according to embodiment 3 of the present invention.

As shown in FIG. 3, the kiln system provided by the present embodiment is in the same sectional state as that of embodiment 1, but the difference is as follows: The hot air of the blast drying section 1 comes from the hot air obtained by mixing the hot air of the firing section 5 and the soaking section 6 with cold air to reduce temperature; and the hot air of the draft drying section comes from the firing section 5.

The heat of the ignition zone of the decarburization section comes from a burner arranged over the ignition zone, and the raw materials with heating values and the organic components in the raw pellets are ignited by the burner to reach an ignition point; at the same time, the ignition zone introduces preheated air from the cooling section, so that natural gas at the burner sufficiently combusts to provide sufficient heat source for ignition; and the ignition zone of the decarburization section also communicates with the exhaust gas treatment system of the draft drying section, so that ignited exhaust gas is drawn out and discharged together with the exhaust gas of the draft drying section into the exhaust gas treatment system.

The present embodiment further provides a method for firing ceramsite and by-producing waste heat by utilizing raw materials with heating values based on the kiln system shown in FIG. 3. The method is substantially the same as that of embodiment 1, but the difference is as follows:

Raw pellet materials are different. In the present embodiment, coal gangue, coal slime, oil sludge, sludge, oil shale and organic solid wastes with heating value contents of 500 kJ/kg to 3,500 kJ/kg, solid wastes with heating values (such as waste coke and cinder with heating value contents of 8,500 kJ/kg to 30,000 kJ/kg) and auxiliary raw materials are batched and then pelletized to form raw pellets with an average grain size of 5 mm to 15 mm. The heating value of the raw pellets is 500 kJ/kg to 3,000 kJ/kg.

Because the different arrangement of the decarburization section leads to the difference in the ignition method and the exhaust gas treatment method and waste heat recovery is also carried out through the waste heat recovery pipeline of the decarburization section, porous lightweight ceramsite with a bulk density of 0.5-1.0 g/cm$^3$ is ultimately obtained through the cooling section.

What is described above is merely the specific embodiments of the present invention. However, the protection scope of the present invention is not limited this, and any alteration or replacement which those skilled in the art can easily think of within the technical scope disclosed by the present invention shall fall within the protection scope of the present invention. Therefore, the protection scope of the present disclosure shall be subject to the protection scope of the claims.

The invention claimed is:

1. A kiln system for firing ceramsite and by-producing waste heat by utilizing raw materials with heating values, comprising a drying section, a preheating section, a firing section, a soaking section, a cooling section, and a decarburization section arranged between the drying section and the preheating section, wherein the decarburization section comprises an ignition zone, a hot air combustion zone and a waste heat recovery pipeline; alternatively the decarburization section comprises the ignition zone, a pyrolysis zone and the waste heat recovery pipeline;

wherein a heat source is introduced into the ignition zone so that a temperature of the ceramsite of the raw materials with heating values in the ignition zone is 400° C. to 900° C., the hot air combustion zone or the pyrolysis zone is configured for combusting or pyrolyzing carbon-containing materials and organic components in the raw materials with heating values in the ceramsite, and the waste heat recovery pipeline is configured for discharging decarburization exhaust gas and recovering heat released after the raw materials with heating values in the ceramsite are combusted or pyrolyzed in the decarburization exhaust gas.

2. The kiln system according to claim 1, wherein a kiln of the kiln system is a belt type roasting machine or a static roasting tunnel kiln.

3. The kiln system according to claim 2, wherein the drying section is divided into a blast drying section and a draft drying section, wherein the blast drying section utilizes a hot air selected from the group consisting of a hot air coming from the cooling section, a hot air heated by the waste heat recovery pipeline, a mixture of the hot air coming from the cooling section and the hot air heated by the waste heat recovery pipeline, and a hot air produced by mixing an exhaust gas discharged by the firing section and the soaking section with cold air to cool down to 250° C. to 400° C.; and the draft drying section utilizes a hot air discharged by the preheating section or the hot air discharged by the firing section and the soaking section.

4. The kiln system according to claim 2, wherein after the ceramsite passes through the decarburization section, a heating value of the ceramsite at an outlet of the decarburization section is not higher than 400 kJ/kg.

5. The kiln system according to claim 1, wherein the heat source of the ignition zone comes from a hot air drawn out from the preheating section and/or the firing section, or an ignition nozzle is arranged in the ignition zone, wherein the ignition nozzle is configured for providing the heat source for the ignition zone.

6. The kiln system according to claim 5, wherein the drying section is divided into a blast drying section and a draft drying section, wherein the blast drying section utilizes a hot air selected from the group consisting of a hot air coming from the cooling section, a hot air heated by the waste heat recovery pipeline, a mixture of the hot air coming from the cooling section and the hot air heated by the waste heat recovery pipeline, and a hot air produced by mixing an exhaust gas discharged by the firing section and the soaking section with cold air to cool down to 250° C. to 400° C.; and the draft drying section utilizes the hot air discharged by the preheating section or the hot air discharged by the firing section and the soaking section.

7. The kiln system according to claim 5, wherein after the ceramsite passes through the decarburization section, a heating value of the ceramsite at an outlet of the decarburization section is not higher than 400 kJ/kg.

8. The kiln system according to claim 1, wherein the hot air combustion zone or the pyrolysis zone is provided with a blast pipeline, wherein the blast pipeline is configured for blowing in a hot air heated by the waste heat recovery pipeline.

9. The kiln system according to claim 8, wherein the drying section is divided into a blast drying section and a draft drying section, wherein the blast drying section utilizes a hot air selected from the group consisting of a hot air coming from the cooling section, the hot air heated by the waste heat recovery pipeline, a mixture of the hot air coming from the cooling section and the hot air heated by the waste heat recovery pipeline, and a hot air produced by mixing an exhaust gas discharged by the firing section and the soaking section with cold air to cool down to 250° C. to 400° C.; and the draft drying section utilizes a hot air discharged by the preheating section or the hot air discharged by the firing section and the soaking section.

10. The kiln system according to claim 8, wherein after the ceramsite passes through the decarburization section, a heating value of the ceramsite at an outlet of the decarburization section is not higher than 400 kJ/kg.

11. The kiln system according to claim 1, wherein the drying section is divided into a blast drying section and a draft drying section, wherein the blast drying section utilizes a hot air selected from the group consisting of a hot air coming from the cooling section, a hot air heated by the waste heat recovery pipeline, a mixture of the hot air coming from the cooling section and the hot air heated by the waste heat recovery pipeline, and a hot air produced by mixing an exhaust gas discharged by the firing section and the soaking section with a cold air to cool down to 250° C. to 400° C.; and the draft drying section utilizes a hot air discharged by the preheating section or a hot air discharged by the firing section and the soaking section.

12. The kiln system according to claim 1, wherein after the ceramsite passes through the decarburization section, a heating value of the ceramsite at an outlet of the decarburization section is not higher than 400 kJ/kg.

13. A method for firing ceramsite and by-producing waste heat by utilizing raw materials with heating values, comprising:

batching and then pelletizing the raw materials with heating values and auxiliary raw materials to form raw pellets with an average grain size of 3 mm to 15 mm;

spreading the raw pellets on a kiln car or a trolley to form a raw material layer with a height of 300 mm to 500 mm, and arranging fired and returned ceramsite under and at both sides of the raw material layer;

sending the kiln car into the kiln system according to claim 1 to pass through the drying section, the decarburization section, the preheating section, the firing section, the soaking section, and the cooling section to prepare ceramsite with a bulk density of 0.5-1.5 g/cm3; and at the same time, recovering waste heat in the decarburization section through the waste heat recovery pipeline.

14. The method according to claim 13, wherein the raw materials with heating values are solid wastes with heating values of 500 kJ/kg to 8,500 kJ/kg, and/or waste coke and cinder with heating values of 8,500 kJ/kg to 30,000 kJ/kg, wherein the solid wastes with the heating values of 500 kJ/kg to 8,500 kJ/kg comprise coal gangue, coal slime, fly ash, slag, fluidized bed ash, coal gasification ash, oil sludge, sludge, oil shale, organic solid wastes and/or domestic garbage.

15. The method according to claim 14, wherein when the raw materials with heating values and the auxiliary raw materials are batched:

if a heating value content of the raw materials with heating values is 500 kJ/kg to 8,500 kJ/kg, a content of the solid wastes is 30% to 100%; and if the heating value content is 8,500 kJ/kg to 30,000 kJ/kg, the content of the solid wastes is 0.5% to 25%; and a heating value of the raw pellets is 500 kJ/kg to 8,500 kJ/kg.

16. The method according to claim 13, wherein the ceramsite with the bulk density of 0.5-1.5 $g/cm^3$ comprises porous lightweight ceramsite with a bulk density of 0.5-1.0 $g/cm^3$ or ordinary ceramsite with a bulk density of 1.0-1.5 $g/cm^3$.

17. The method according to claim 13, wherein a kiln of the kiln system is a belt type roasting machine or a static roasting tunnel kiln.

18. The method according to claim 13, wherein the heat source of the ignition zone comes from a hot air drawn out from the preheating section and/or the firing section, or an ignition nozzle is arranged in the ignition zone, wherein the ignition nozzle is configured for providing the heat source for the ignition zone.

19. The method according to claim 13, wherein the hot air combustion zone or the pyrolysis zone is provided with a blast pipeline, wherein the blast pipeline is configured for blowing in a hot air heated by the waste heat recovery pipeline.

20. The method according to claim 13, wherein the drying section is divided into a blast drying section and a draft drying section, wherein the blast drying section utilizes a hot air selected from the group consisting of a hot air coming from the cooling section, a hot air heated by the waste heat recovery pipeline, a mixture of the hot air coming from the cooling section and the hot air heated by the waste heat recovery pipeline, and a hot air produced by mixing an exhaust gas discharged by the firing section and the soaking section with a cold air to cool down to 250° C. to 400° C.; and the draft drying section utilizes a hot air discharged by the preheating section or a hot air discharged by the firing section and the soaking section.

* * * * *